United States Patent
De Boeck

(10) Patent No.: US 7,551,630 B2
(45) Date of Patent: Jun. 23, 2009

(54) ROUTER TO ROUTE PACKETS

(75) Inventor: Hendrik Jan Rosalie De Boeck, Londerzeel (BE)

(73) Assignee: Alcatel, Paris (FR)

( * ) Notice: Subject to any disclaimer, the term of this patent is extended or adjusted under 35 U.S.C. 154(b) by 858 days.

(21) Appl. No.: 10/863,275

(22) Filed: Jun. 9, 2004

(65) Prior Publication Data
US 2005/0002377 A1 Jan. 6, 2005

(30) Foreign Application Priority Data
Jun. 13, 2003 (EP) .................................. 03291427

(51) Int. Cl.
*H04L 12/28* (2006.01)
(52) U.S. Cl. ...................................... 370/401; 370/419
(58) Field of Classification Search ......... 370/229–235, 370/351, 389, 392, 401, 402, 232, 359, 395.5, 370/411, 419; 709/238, 249
See application file for complete search history.

(56) References Cited

U.S. PATENT DOCUMENTS 6,970,426 B1 * 11/2005 Haddock .................. 370/235.1
7,027,395 B2 * 4/2006 Elloumi et al. .............. 370/231
2002/0012348 A1 * 1/2002 Mizuhara et al. ............ 370/392
2002/0089931 A1 7/2002 Takada et al.
2003/0081624 A1 * 5/2003 Aggarwal et al. ............ 370/412
2004/0100901 A1 * 5/2004 Bellows ...................... 370/230
2004/0125796 A1 * 7/2004 Reader ........................ 370/359

* cited by examiner

*Primary Examiner*—Brenda Pham
(74) *Attorney, Agent, or Firm*—Sughrue Mion, PLLC

(57) ABSTRACT

A router for routing packets in a telecommunication network is provided. The router comprises a plurality of inputs for receiving packets and a common processor coupled to the inputs for processing at least part of the packets i.e. the control packets according to one or more routing protocols. At least one packet marker is coupled between a first plurality of inputs of the plurality of inputs and the common processor. The marker marks at least part of the incoming control packets. The marking is provided according to a receiving rate of control packets that are received at the first plurality of inputs and that are to be processed according to a first routing protocol. The incoming control packets are received at one of the first plurality of inputs and are processed according to the first routing protocol. The marker therefore provides marked control packets. The common processor comprises a discarder for discarding or dropping, before the processing of the control packets, one or more of the marked control packets. The discarding is based upon the kind of marking of the marked control packets and is provided according to predefined rules and conditions.

15 Claims, 1 Drawing Sheet

ROUTER TO ROUTE PACKETS

Figure 1:
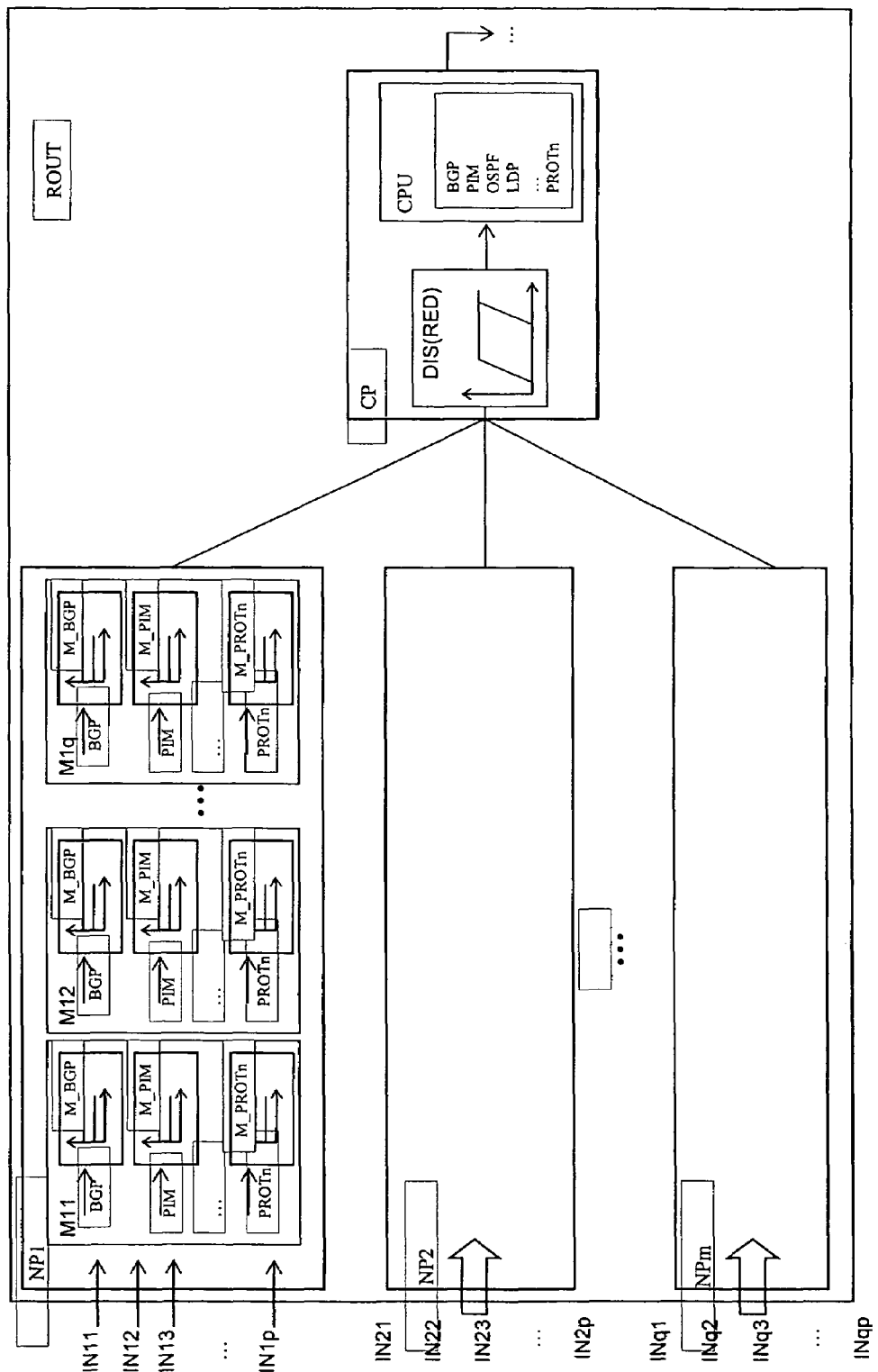

The present invention relates to a router to route packets, and to a telecommunication network that comprises such a router and to a method to route packets to be executed by such a router.

Such a router is already known in the art. Indeed, a router for routing packets in a telecommunication network usually comprises a plurality of inputs for receiving the packets.

It has to be explained that the received packets in a telecommunication network are two kinds of packets. The first kind is called the transit traffic. These are data packets that are not leaving the forwarding path. The second kind of packet is called the control traffic. These packets comprise the required control data to create the required forwarding path and might possibly be adapted. The control packets are routed to a processor called hereafter, common processor.

It has to be clear that the present invention is dealing with this second kind of control packets that are called hereafter shortly 'packets' since only these packets are to be routed from the different inputs to the common processor in order to be processed by this common processor. In the event when this application describes a data packet that only has to follow the forwarding data-path, it will be mentioned explicitly.

The control packets received by the common processor are processed by the common processor according to its specific routing protocol such as e.g. the Border Gateway Protocol or shortly BGP protocol, the Protocol Independent Multicast or shortly the PIM protocol, the Open Shortest Path First protocol or shortly OSPF protocol, the Label Distribution Protocol or shortly the LDP protocol or in order to be general a protocol called shortly PROTn.

It has to be explained that the control packets are received at the different inputs with a certain receiving rate. In the event when this receiving rate exceeds a predefined receiving rate, the processing capacity of the common processor might as well be exceeded. In such a case, the common processor is not able to process all received packets anymore. According to prior art solutions, received control packets need to be dropped in order to relieve the common processor.

Such a dropping of received control packets is provided by prior art solutions at the different inputs. According to this prior art solution, a buffer that is coupled to the different inputs is used to buffer the received packets. It has to be remarked that, the part of the data-path that comprises the common processor and its associated buffer is called hereafter the common control-point. In the event when the filling level of the buffer exceeds a predefined buffer threshold the different inputs of the router will drop the next received control packets according to a random sequence or according to a one-by-one sequence. It has to be explained that the predefined threshold of the buffer is defined at design time of the router based on the known processing capacity of the common processor. This dropping step is executed during a predefined period or until the filling level is again below the threshold.

Another way of dropping control packets in order to relieve the common processor is dropping packets or also called hereafter discarding packets at the common control point itself. At the common control point the received control packets coming from the different inputs are dropped until the common processor is able to follow the receiving rate again.

It has to be explained that the packets are dropped regardless of the content of the different packets. Such a straightforward discarding of excess traffic at the common control point protects the common processor from a too high load but doesn't guarantee that only packets from the violating stream are throttled. Indeed, dropping packets randomly impacts streams running at a very low rate such as keep-alive traffic, too. In this way, the minimum number of packets that is needed to keep these other services running doesn't reach the application and are interpreted as a timeout from the remote peers. The remote peers are closed and the services are stopped.

An object of the present invention is to provide a router to execute a routing method, of the above known type, to relieve the common processor of the common control point in the event of an excess of incoming control packets to be processed by the common processor.

According to the invention, this object is achieved with the router of claim 1 and the routing method of claim 2.

Indeed, in order to realize this object, the router comprises at least one control packet marker that is coupled to a first subset of inputs and the common processor. The marker is comprised for marking incoming control packets according to a receiving rate of control packets that are received at this subset of inputs and that are moreover to be processed according to a first routing protocol e.g. the BGP protocol. The incoming control packets that are to be marked are received at one of this subset of inputs and are also to be processed according to this first routing protocol. The marker provides hereby marked control packets. Furthermore, at the common control point, the common processor comprises a discarder for discarding control packets before the control packets are to be processed by the common processor. The discarding of the control packets is based on the kind of marking of the marked control packets and on predefined rules and conditions.

So, due to the marking of the incoming control packets based on the stream it belongs to, in times of high load, only those control packets are dropped by the discarder at the common processor which are marked as excess traffic and which have to be dropped according to the predefined rules and conditions such as e.g. an implementation of RED. This doesn't imply that all packets being marked as excess traffic needs to be dropped. Indeed, only those packets which are marked and wherefore the implemented algorithm generates a drop decision, needs to be discarded.

The marking of packets is also called coloring of packets. This means that the packets are marked according to a predefined color code e.g. green in the event of no excess traffic, yellow in the event of minor excess traffic and red in the event of highly excess traffic.

The marking is defined in function of the receiving rate of control packets being received at an identical subset of inputs and being to be processed by the common processor according to an identical protocol. This means that when e.g. two control packets, which are received at one of the inputs of a same subset but which ought to be processed by the common processor according to different protocols, are taking part in the determination of different receiving rates of control packets. Although both packets are received at one of the inputs of a same subset of inputs, one control packet is counted for keeping track of the receiving rate for the first protocol and the other control packet is counted for keeping track of the receiving rate for the second protocol.

On the other hand, when two control packets are to be processed by the common processor under the same protocol rules e.g. OSPF protocol, but both packets are received at one of an input of different subsets of inputs, both packets are counted for keeping track of different receiving rate of packets. So, a stream of control packets which are taken into account for keeping track of the same receiving rate of control packets, is defined as a packet flow belonging to the same protocol and the same subset of incoming interfaces i.e. inputs.

The aim of the present invention is the co-operation between the ingress i.e. the different subsets of inputs and the common control point i.e. the discarding at the common processor.

It is to be noticed that the term 'comprising', used in the claims, should not be interpreted as being limitative to the means listed thereafter.

Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein FIG. 1 represents a router according to the present invention.

The working of the device according to the present invention in accordance with its telecommunication environment that is shown in figure 1 will be explained by means of a functional description of the different blocks shown therein. Based on this description, the practical implementation of the blocks will be obvious to a person skilled in the art and will therefore not be described in details. In addition, the principle working of the routing method according to the present invention will be described in further detail FIG. 1 describes a router ROUT for routing packets in a telecommunication network. The router ROUT comprises a plurality of inputs IN11, IN12, IN13, . . . , IN1p, IN21, IN22, IN23, IN2p, INq, INq2, INq3, . . . , INqp. Furthermore the router ROUT comprises a plurality of network processors NP1, NP2, . . . , NPm each coupled to a subset of inputs and to a common processor CP of the router ROUT.

The common processor CP comprises a Central Processing Unit CPU and a discarder DIS(RED). The discarder DIS is coupled to an input of the common processor CP that is coupled to the different network processors NPqp and the Central Processing Unit is coupled to the discarder DIS.

It has to be remarked that once the packets are processed by the central processor, the network processors are able to clear their forwarding data-path and are able to receive new control packets. However this goes beyond the aim of the present invention.

Hereby it becomes clear that FIG. 1 shows only the traffic in the router ROUT of the control packets towards the common control point. It is to be noticed that the traffic of the data packets i.e. first kind of packets explained above, is not shown in order not to overload the Figure.

The network processors NP1, NP2, . . . , NPm each comprises a plurality of marking-sets such as M11, M12, . . . , M1q on the network processor NP1.

Each marking-set such as M11, M12, . . . and M1Q comprises a marker such as M_BGP, M_PIM, . . . and M_PROTn for each protocol that can be handled by the common processor CP. In this way comprises each marking-set e.g. M12 a plurality of markers M12(M_BGP), M12(M_PIM), . . . and M12(M_PROTn).

The inputs are physical sorted in different kind of subsets.

A first division is the division of the plurality of inputs according to the different network processors NP1, NP2, . . . , NPm. Each input of the plurality of inputs of the router ROUT is an interface to one of the network processors. In this way one or more inputs IN11, IN12, IN13, . . . , IN1p of the plurality of inputs IN11, IN12, IN13, . . . , IN1p, IN21, IN22, IN23, . . . , IN2p, INq1, INq2, INq3, . . . , INqp, are coupled to the first network processor NP1; and one or more inputs of the plurality of inputs are coupled to the second network processor NP2; . . .

A second division of inputs is the division of all inputs coupled to a same network processor into subsets of inputs according to a set of markers e.g. M11. In this way a first subset of inputs or also called a first plurality of inputs is IN11, IN12 and IN13. This first subset of inputs IN11, IN12 and IN13 is associated to a first set of markers M11(M_BGP), M11(M_PIM), . . . , M11(M_PROTn) being comprised in the marking-set M11.

Hereby is a stream of packets defined as all packets received by the router ROUT a) via one subset or called a first plurality of inputs e.g. subset IN14, IN15, IN16 and IN17 which are associated to one marking-set e.g. M12; and b) wherefore a same routing protocol e.g. PIM is to be used by the common processor CP.

In this way is the marker M12(M_PIM) uniquely associated to the stream of packets of the above example i.e. the stream of packets received via one of the inputs IN14, IN15, IN16 and IN17; and wherefore the PIM protocol is to be used by the common processor CP.

Upon reception of an incoming packet at one of the inputs of the router ROUT, and during the determination of the required service related to the packet also the target common processor CP is determined. It has to be remarked here that although the description of this embodiment describes the presence of only one common processor CP in the router ROUT, the present invention is not limited to application with only one common processor CP in a router ROUT. According to such an implementation, the router ROUT comprises a determining functional block in order to determine upon reception of an incoming packet at one of the inputs of the router ROUT the associated common processor to process this control packet. It has to be understood that in the event of such an implementation excess traffic for one common processor is handled according to an application of the present invention and excess traffic for a second common processor is handled according to a second time the application of the present invention.

The protocol to be used for the processing of the control packet is determined upon reception of the control packet at the input of the router ROUT. Based on this kind of protocol the stream of packets whereto the received control packet belongs to is also determined. Furthermore, the uniquely associated marker of this stream of packets is also determined. The control packet is forwarded from the input of the router ROUT to the uniquely associated marker of the control packet.

It has to be explained that it is preferred for this particular description of an embodiment to encode the receiving rate in a color field. Every marker e.g. M11(M_BGP) comprises a color-blind two-rate three-color marker. It has to be remarked that other kind of markers might be implemented in the different functional block markers of the present invention. The kind of marker used to mark the incoming control packets goes beyond the aim of the present invention. The aim of the present invention is the fact that the control packets are marked in function of a receiving rate of the control packet stream whereto this control packet belongs.

It is preferred for this particular embodiment to execute a periodic sampling of the marker in a period of one second. The first number of received control packet bytes is marked green, the next up to a second number are marked yellow and the remainder re marked red.

A preferred embodiment of the present application comprises also a dropper (not shown in the FIG. 1) at the ingress level. Any colored red packet is immediately discarded at the ingress. Such a functional block that drops excess control packets at the ingress of the router ROUT is already known in the art. Indeed, as described above, received control packets needs to be dropped in order to relieve the common processor. However, according to the implementation of this preferred embodiment the control packets are first colored at the ingress level of the router ROUT. Hereafter the colored packets are forwarded to a dropper also called a discarder. This dropper is enabled to drop the colored control packets being colored with the color red immediately. The green and yellow packets from every network processor are further forwarded to the common control point i.e. to the common processor CP.

The discarder DIS of the common processor CP first receives the green and yellow packets. This discarder DIS drains the packets to the central processing unit CPU at a predefined draining rate. This predefined draining rate can be implemented as a constant value or can as well be defined as a variable parameter.

The installed discarding algorithm i.e. discarding according to the marking and according to predefined rules and conditions will now be explained. This will be explained by means of an example. Presume an actual situation whereby the above mentioned predefined draining rate is lower as the actual arrival rate at the discarder DIS of the green and yellow control packets. In such an event the buffer i.e. the queue of the common control point starts filling. From a certain filling level of the buffer a discarding algorithm is applied. For this particular embodiment it is preferred to use the known Random Early Detection mechanism or shortly called RED. The RED algorithm is applied to the yellow marked packets. The 100% drop rate for the yellow packets occurs when the filling level keeps on increasing. Green packets are not to be discarded.

No packets are dropped during normal operation although some traffic might be colored yellow during reception of some bursty traffic.

So, at the time when the common control point gets overwhelmed by an excess of control traffic i.e. reception of too much control packets during a same period, the common processor CP has still enough information based upon the different colors of the control packets to discard/drop only violating packet streams. The other services i.e. the other control packet streams will keep on receiving a guaranteed minimum flow.

The present invention provides due to the presence of the marking step at the ingress of the router ROUT and due to the step of discarding based upon this marking at the common control point of the router ROUT an improved behavior during e.g. Denial of Service attacks or shortly DoS attacks and a guaranteed performance of the central processing unit CPU of the common processor CP at the common control point.

It has to be remarked that the mentioned protocols such as BGP, PIM, OSPF and LDP are only mentioned as a matter of example. It is clear to a person skilled in the art that other protocols might be used by the processor to process the control packets and that, with minor changes, the above description of an embodiment might be adapted to a router ROUT for routing control packets which is enabled to receive control packets and to process with its common processor CP these control packets that belong to a stream of control packets that applies another routing protocol.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A router for routing packets in a telecommunication network, said router comprises a plurality of inputs for receiving said packets and a common processor (CP) coupled to said plurality of inputs for processing at least part of said packets according to one or more routing protocols, wherein said router comprises at least one packet marker (M11 (M_BGP)), coupled between a first plurality of inputs (IN11, IN12, IN13) of said plurality of inputs and said common processor (CP), for marking incoming control packets of said at least part of said packets, according to a receiving rate of control packets received at said first plurality of inputs (IN11, IN12, IN13) and to be processed according to a first routing protocol, said incoming control packets being received at one of said first plurality of inputs (IN11, IN12, IN13) and to be processed according to said first routing protocol, said marker (M11(M_BGP)) provides thereby marked control packets; and said common processor (CP) comprises a discarder (DIS) for discarding, before said processing, one or more of said marked control packets according to said marking and according to predefined rules and conditions.

2. A routing method to route packets in a telecommunication network, comprising the steps of:
receiving said packets by a plurality of inputs of said router; and processing at least part of said packets according to one or more routing protocols by a common processor (CP) coupled to said plurality of inputs, wherein said routing method further comprises a step of marking incoming control packets of said at least part of said packets by a packet marker (M11(M_BGP)) according to a receiving rate of control packets received at a first plurality of inputs (IN11, IN12, IN13) of said plurality of inputs and to be processed according to a first routing protocol and providing thereby marked control packets, said incoming control packets being received at one (IN12) of a first plurality (IN11, IN12, IN13) of said plurality of inputs and are to be processed according to said first routing protocol; and said routing method further comprises, before said step of processing, a step of discarding by a discarder (DIS) associated to said common processor (CP) one or more of said marked control packets according to said marking and according to predefined rules and conditions.

3. A telecommunication network that comprises a router for routing packets, wherein said router is a router according to claim 1.

4. A router according to claim 1, wherein said router comprises a plurality of common processors each for processing a different part of said packets, each common processor including a respective discarder for discarding one or more of said marked control packets according to said marking and according to predefined rules and conditions.

5. A router according to claim 1, wherein said packet marker comprises a color-blind two-rate three-color marker.

6. A router according to claim 1, wherein each control packet belongs to a packet stream and wherein said packet marker designates a receiving rate of the packet stream to which said control packet belongs.

7. A router according to claim 1, wherein said marker designates a first number of control packets received within a predetermined period of time with a first designation, a second number of control packets received after said first number of packets during said predetermined period of time with a second designation, and a third number of control packets received after said second number of packets during said predetermined period of time with a third designation.

8. A router according to claim 7, wherein control packets with said third designation are immediately discarded.

9. A router according to claim 8, wherein said discarder discards packets with said second designation when a number of control packets waiting to be processed reaches a predetermined level.

10. A method according to claim 2, wherein there are a plurality of common processors each for processing a different part of said packets, said method comprising the step of discarding one or more of said marked control packets according to said marking and according to predefined rules and conditions separately for each control processor.

11. A method according to claim 2, wherein said packet marker comprises a color-blind two-rate three-color marker.

12. A method according to claim 2, wherein each control packet belongs to a packet stream and wherein said packet marker designates a receiving rate of the packet stream to which said control packet belongs.

13. A method according to claim 2, wherein said marker designates a first number of control packets received within a predetermined period of time with a first designation, a second number of control packets received after said first number of packets during said predetermined period of time with a second designation, and a third number of control packets received after said second number of packets during said predetermined period of time with a third designation.

14. A method according to claim 13, wherein control packets with said third designation are immediately discarded.

15. A method according to claim 14, wherein said discarder discards packets with said second designation when a number of control packets waiting to be processed reaches a predetermined level.

* * * * *